(12) United States Patent
Wu et al.

(10) Patent No.: US 10,989,289 B2
(45) Date of Patent: Apr. 27, 2021

(54) TORQUE TRANSMISSION ARRANGEMENT

(71) Applicant: ZF FRIEDRICHSHAFEN AG, Friedrichshafen (DE)

(72) Inventors: Richard Wu, Westland, MI (US); Christian Schneider, Northville, MI (US); Troy Menebroker, Plymouth, MI (US)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 16/682,701

(22) Filed: Nov. 13, 2019

(65) Prior Publication Data
US 2020/0256443 A1    Aug. 13, 2020

(30) Foreign Application Priority Data

Feb. 8, 2019  (DE) ...................... 10 2019 201 645.6

(51) Int. Cl.
*F16H 45/02*  (2006.01)
*F16F 15/14*  (2006.01)
*F16F 15/123*  (2006.01)

(52) U.S. Cl.
CPC ....... *F16H 45/02* (2013.01); *F16F 15/12353* (2013.01); *F16F 15/145* (2013.01); *F16H 2045/0231* (2013.01); *F16H 2045/0263* (2013.01); *F16H 2045/0284* (2013.01)

(58) Field of Classification Search
CPC ............. F16H 45/02; F16H 2045/0221; F16H 2045/0226; F16H 2045/0231; F16H 2045/0263; F16H 2045/0284; F16F 15/12353; F16F 15/145

See application file for complete search history.

(56) References Cited

U.S. PATENT DOCUMENTS

| | | | | |
|---|---|---|---|---|
| 9,458,918 B2 * | 10/2016 | Rossner | ................... | F16H 45/02 |
| 2015/0114781 A1 * | 4/2015 | Zaugg | ..................... | F16H 45/02 192/3.28 |
| 2018/0238397 A1 * | 8/2018 | Clark | ...................... | F16H 45/02 |

FOREIGN PATENT DOCUMENTS

| | | | |
|---|---|---|---|
| DE | 102014213629 A1 * | 1/2016 | ............. F16D 48/06 |
| JP | 5345962 | 11/2013 | |

\* cited by examiner

*Primary Examiner* — Richard M Lorence
(74) *Attorney, Agent, or Firm* — Cozen O'Connor

(57) ABSTRACT

A torque transmission arrangement is provided with a clutch device which has a clutch input and output, and a vibration damping device having at least two vibration damping units arranged at a radial offset with respect to one another, an input of the vibration damping device operatively connected to the clutch output, and an output of the radially outermost vibration damping unit being operatively connected by an intermediate transmission element to an input of the radially innermost vibration damping unit operatively connected via an output of the vibration damping device to an output unit, the clutch device partially axially overlapping with one of the vibration damping units, and being connected radially between the two vibration damping units to the intermediate transmission of the vibration damping device. The intermediate transmission is connected to an absorber mass carrier of an absorber system likewise assigned to the vibration damping device.

2 Claims, 1 Drawing Sheet

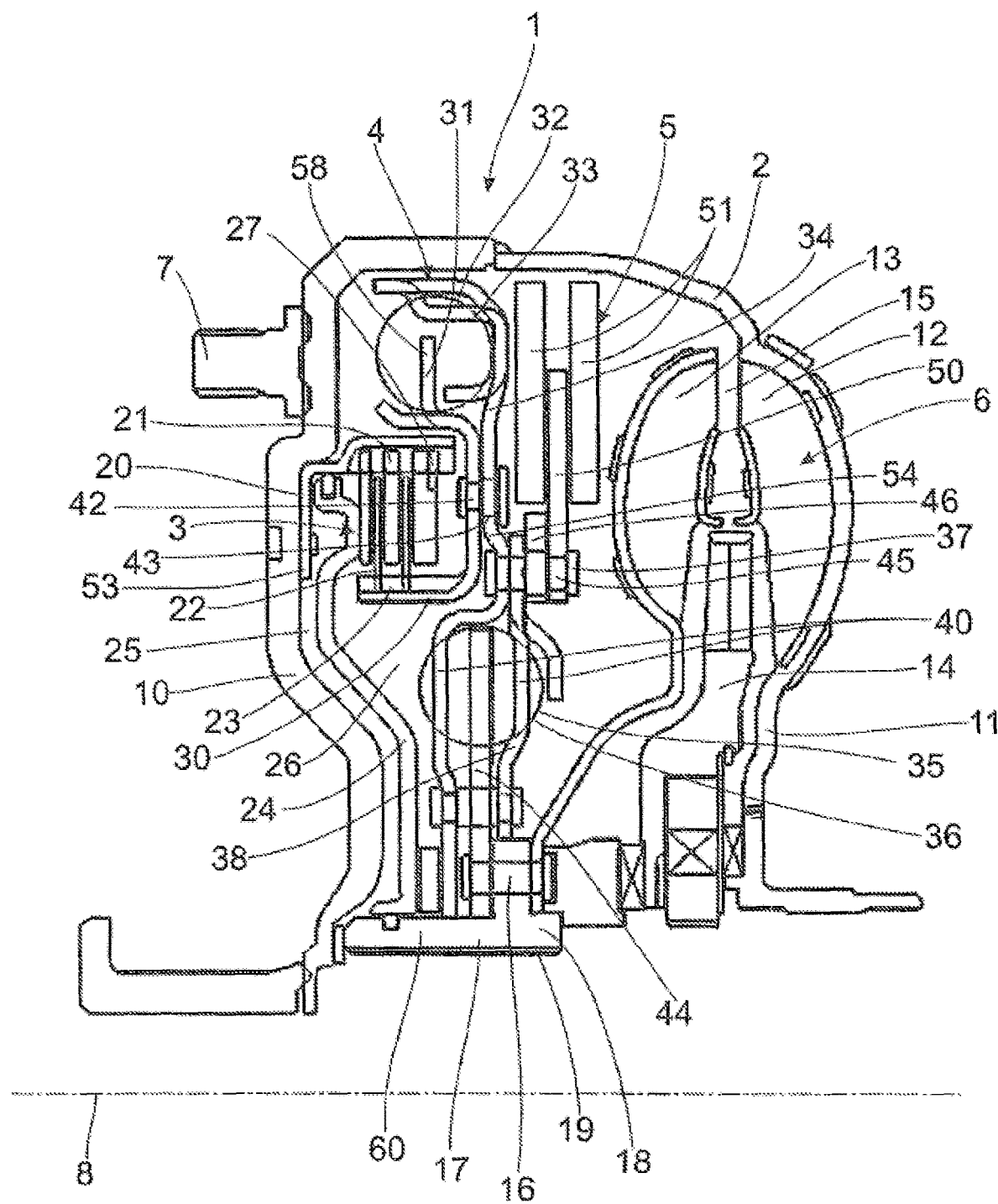

TORQUE TRANSMISSION ARRANGEMENT

BACKGROUND OF THE INVENTION

1. Field of the Invention

The invention relates to a torque transmission arrangement having a clutch device which has a clutch input and a clutch output, and having a vibration damping device which has at least two vibration damping units which are arranged at a radial offset with respect to one another, an input of the vibration damping device being operatively connected to the clutch output, and an output of the radially outermost vibration damping unit being operatively connected by an intermediate transmission element to an input of the radially innermost vibration damping unit which for its part is operatively connected via an output of the vibration damping device to an output unit, the clutch device being arranged so as to overlap axially at least partially with at least one of the vibration damping units, and being connected at least substantially radially between the two vibration damping units to the intermediate transmission element of the vibration damping device.

2. Description of Related Art

A torque transmission arrangement of this type is known from JP 5345962 B2. Whereas the input of the clutch device, which has a plurality of drive-side and output-side clutch elements, is fastened in the form of a drive-side clutch element carrier to the housing cover of a housing of the torque transmission arrangement, the output of the clutch device is configured as an output-side clutch element carrier and interacts, as an axial lateral covering of the radial inner vibration damping unit, with a further lateral covering. Together with the output of the radially outer vibration damping unit, said coverings form an intermediate transmission means of the vibration damping device which serves as an input for the radially inner vibration damping unit.

Although a quantitative reduction of the torsional vibrations, which are introduced via the housing cover, may well be achieved by way of the known vibration damping device, there is however no possibility to counteract excitations of a defined order which are introduced via the housing cover from a drive, such as an internal combustion engine.

SUMMARY OF THE INVENTION

One aspect of the invention is based on the object of configuring a vibration damping device for a torque transmission arrangement in the case of a compact axial and radial configuration of the torque transmission arrangement, in such a way that not only torsional vibrations can be reduced quantitatively, but rather, moreover, excitations of a defined order can also be counteracted.

According to one aspect of the invention, a torque transmission arrangement having a clutch device is proposed, which clutch device has a clutch input and a clutch output, and is provided with a vibration damping device that has at least two vibration damping units arranged at a radial offset with respect to one another, an input of the vibration damping device being operatively connected to the clutch output, and an output of the radially outermost vibration damping unit being operatively coupled by an intermediate transmission to an input of the radially innermost vibration damping unit which for its part is operatively connected via an output of the vibration damping device to an output device, the clutch device being arranged so as to overlap axially at least partially with at least one of the vibration damping units, and being connected at least substantially radially between the two vibration damping units to the intermediate transmission means of the vibration damping device.

It is of particular significance here that the intermediate transmission is connected, furthermore, to an absorber mass carrier of an absorber system, which is likewise assigned to the vibration damping device. Since an absorber system that has an absorber mass carrier with at least one absorber mass that can be moved relative to the absorber mass carrier and is fastened to the latter is suitable for absorbing excitations of a defined order which are generated by way of a drive, such as an internal combustion engine, the function of the vibration damping device is enhanced considerably, so as to go beyond the quantitative reduction of torsional vibrations.

In particular, when the clutch device is arranged so as to overlap axially at least partially with at least one of the vibration damping units and is connected at least substantially radially between the two vibration damping units to the intermediate transmission of the vibration damping device, the torque transmission arrangement can be of compact configuration in each case both in the axial direction and in the radial direction, since, of the clutch device and the vibration damping device, one device engages into possible clearances of the respective other one of said devices. This principle also utilizes the absorber system in the case of a torque transmission arrangement if the latter is configured with an intermediate transmission which has at least two coverings which act axially on both sides of the radially innermost vibration damping unit and are connected to one another by a riveted connection, by the riveted connection which connects the two coverings to one another serving, furthermore, to receive the absorber mass carrier of the absorber system. This is the case, in particular, when a spacer element is provided axially between the coverings of the intermediate transmission and the absorber mass carrier of the absorber system, which spacer element is held in a predefined position relative to the coverings and relative to the absorber mass carrier by way of the riveted connection, and is capable of reducing the spacing of components of the absorber system, such as the absorber masses, with respect to the vibration damping device as far as possible by way of its presence. This configuration can be of particularly compact configuration when the riveted connection has rivets with multiple stages axially, the individual axial stages of the respective rivet bringing about axial positioning of the coverings and the absorber mass carrier relative to one another.

BRIEF DESCRIPTION OF THE DRAWINGS

In the following text, the invention is described in greater detail using one exemplary embodiment. In the drawing:

The FIGURE is a torque transmission arrangement having a clutch device and having a vibration damping device that has at least two vibration damping units arranged at a radial offset with respect to one another, and an absorber system.

DETAILED DESCRIPTION OF THE PRESENTLY PREFERRED EMBODIMENTS

The FIGURE shows a torque transmission arrangement 1 that has a clutch device 3, a vibration damping device 4 and an absorber system 5 in a housing 2. In the case of the present exemplary embodiment, the torque transmission arrangement 1 is part of a transmission device 6 configured as a hydrodynamic torque converter, but can likewise also be part of another transmission device.

The housing 2 can be connected fixedly to a drive, such as an internal combustion engine, so as to rotate with it by attaching elements 7 in a manner which is not shown, and performs a rotational movement about a central axis 8 in the case of an introduction of a rotating movement by way of the drive. The housing 2 has a housing cover 10 on its side which faces the drive and a housing shell 11, which is fastened to the housing cover 10 on its side which faces away from the drive. The housing shell 11 serves to form a pump impeller 12 that forms a hydrodynamic circuit 15 together with a turbine wheel 13 and a stator 14. The turbine wheel 13 is received by a riveted connection 16 on a hub 17, which is active as an output device 18, by the latter being connected fixedly to a transmission input shaft (not shown, active as an output) so as to rotate with it via an internal toothing system 19.

The housing cover 10 receives a drive-side clutch element carrier 20 that serves as an input 53 of the clutch device 3 and serves to receive drive-side clutch elements 21 in a torque-proof manner, which drive-side clutch elements 21 are assigned functionally output-side clutch elements 22 that engage into an output-side clutch element carrier 23 in a torque-proof manner. The drive-side clutch element carrier 20 engages around a clutch piston 24 in a sealing manner, which clutch piston 24 is centred in an axially movable manner on the hub 17 of the output device 18. Together with the housing cover 10, the clutch piston 24 delimits a first pressure space 25, whereas a second pressure space 26 extends on the opposite side of the clutch piston 24. The supply of the pressure spaces 25, 26 takes place in a manner not shown radially from the inside from a region of the transmission device 6, which region surrounds the central axis 8 directly. If a positive pressure is established in the first pressure space 25 with respect to the second pressure space 26, the clutch piston 24 moves in the direction of the clutch elements 21 and 22, in order to press them together after the drive-side clutch element 21 which is axially furthest away from the clutch piston 24 has come into contact with an axial support 27. The clutch device 3 is then engaged; it at least substantially transmits the torque, which comes from the housing cover 10 to its output-side clutch element carrier 23 which serves as an output 30. Conversely, a positive pressure in the second pressure space 26 with respect to the first pressure space 25 will bring about a situation where the clutch piston 24 is moved in the direction of the housing cover 10 and releases the clutch elements 21, 22 as a result. The clutch device 3 is then disengaged; it transmits at least no substantial torque to its output-side clutch element carrier 23, which serves as an output 30.

The output 30 of the clutch device 3 is operatively connected by loading elements 31 to spring units 32 of a radially outer vibration damping unit 33, and is therefore active as an input 58 of the vibration damping device 4. The spring units 32 are supported on the other side on a first covering 34, which serves as an output 54 of the first vibration damping unit, and reaches radially inwards to spring units 35 of a radially inner vibration damping unit 36, and is connected by a riveted connection 37 to a second covering 38. The two coverings 34, 38 are part of an intermediate transmission 40 between the spring units 32, 35 of the vibration damping units 33, 36. The relative deflection width of the intermediate transmission 40 with respect to the output 30 of the clutch device 3 is delimited, for the benefit of limited loading of the spring units 32 of the radially outer vibration damping unit 33, by way of a rivet 42 fastened to the output 30 and engages into a recess 43 of the intermediate transmission means 40, which recess 43 extends in the circumferential direction.

The spring units 35 of the radially inner vibration damping unit 36 are supported at the other end on the circumferential side on an output-side hub plate 44 fastened by the riveted connection 16 to the hub 17, which is active as an output device 18, and is therefore connected fixedly to the turbine wheel 13 so as to rotate with it. The hub 17 acts as an output 60 of the vibration damping device 4.

The riveted connection 37 is used to fasten an absorber mass carrier 50 of the absorber system 5 to the intermediate transmission 40. To this end, at least part of the rivets 45 of the riveted connection 37 are configured axially in multiple stages with regions of smaller diameter and with regions of greater diameter. As a result, the rivets 45 act as spacer elements. A spacer element 46 is provided axially between the absorber mass carrier 50 and the adjacent covering 38, by way of which spacer element 46 the spacing of the absorber system 5 from the vibration damping device 3 is defined, by the absorber mass carrier 50 being arranged at a predetermined axial spacing from the intermediate transmission 40. In its radially outer region, the absorber mass carrier 50 serves to receive absorber masses 51, which are provided on both sides such that they can be moved relative to one another.

If excitations of one order which are assigned to a torque which is provided by the drive are introduced, the said excitations are conducted, in the case of an engaged clutch device 3, from the housing 2 via the drive-side clutch element carrier 20 and the clutch elements 21 and 22 to the output-side clutch element carrier 23 which serves as an output 30 of the clutch device 3, and therefore to the input 58 of the vibration damping device 4. From the said input 58, a transmission of the torque and therefore of the excitations takes place to the spring units 32 of the radially outer vibration damping unit 33, and from the said spring units 32 via the intermediate transmission 40 to the spring units 35 of the radially inner vibration damping unit 36, from which forwarding takes place to the hub 17 of the output device 18, which hub 17 serves as an output 60 of the vibration damping device 4. In the case of the said transmission, the excitations assigned to the torque are transmitted to the absorber system 5 by way of attachment of the absorber mass carrier 50 of the absorber system 5 to the intermediate transmission 40, the absorber masses 51 of which absorber system 5 counteract the said excitations by way of a relative deflection with respect to the absorber mass carrier 50. At the same time, the vibration damping units 33, 36 reduce torsional vibrations which are superimposed on the introduced torque.

As the FIGURE further shows, the clutch element carriers 20 and 23 of the clutch device 3 are arranged so as to overlap axially at least partially with the vibration damping units 33, 36 of the vibration damping device 3, whereas the vibration damping units 33, 36 delimit the clutch element carriers 20 and 23 radially on the outside and radially on the inside. In addition, on account of its attachment to the intermediate transmission 40 by the riveted connection 37, the absorber system 10 bears tightly against the intermediate transmission means 40 and therefore against the vibration damping device 3, especially in the case of dimensioning of the spacing of the absorber mass carrier 50 with respect to the intermediate transmission 40 by the spacer element 46. This results in an extremely compact torque transmission arrangement 1 despite a high performance capability, both in the radial direction and in the axial direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torque transmission arrangement comprising:
   an intermediate transmission element;
   a clutch device which has a clutch input and a clutch output;
   a vibration damping device which has at least two vibration damping units arranged at a radial offset with respect to one another,
   an input of the vibration damping device is connected to the clutch output,
   an output of a radially outermost vibration damping unit of the at least two vibration damping units is connected by the intermediate transmission element to an input of a radially innermost vibration damping unit of the at least two vibration damping units which is connected for limited relative rotation via an output of the vibration damping device to an output unit,
   wherein the clutch device is arranged to at least partially axially overlap with at least one of the at least two vibration damping units of the at least two vibration damping units, and
   wherein the clutch device is connected at least partially radially between the at least two vibration damping units, and
   wherein the clutch device output is connected to the intermediate transmission element of the vibration damping device;
   and wherein the torque transmission arrangement further comprises an absorber system having an absorber mass carrier connected to the intermediate transmission element,
   wherein the intermediate transmission element has at least two coverings which act axially on both sides of the radially innermost vibration damping unit and are connected to one another by a riveted connection,
   wherein, the riveted connection, which connects the at least two coverings to one another, fastens the absorber mass carrier of the absorber system to the intermediate transmission element, and
   a spacer element provided axially between the coverings of the intermediate transmission element and the absorber mass carrier of the absorber system, which spacer element is held in a predefined position relative to the coverings and relative to the absorber mass carrier by way of the riveted connection.

2. The torque transmission arrangement according to claim 1, wherein the riveted connection has rivets with multiple stages axially, the respective axial stages of each respective rivet having respective diameters bringing about axial positioning of the coverings and the absorber mass carrier relative to one another.

* * * * *